United States Patent [19]

Kamath et al.

[11] 4,426,339

[45] Jan. 17, 1984

[54] METHOD OF MAKING ELECTRICAL DEVICES COMPRISING CONDUCTIVE POLYMER COMPOSITIONS

[75] Inventors: Hundi P. Kamath, Foster City; Jeffrey C. Leder, Redwood City, both of Calif.

[73] Assignee: Raychem Corporation, Menlo Park, Calif.

[21] Appl. No.: 251,910

[22] Filed: Apr. 7, 1981

Related U.S. Application Data

[63] Continuation of Ser. No. 24,369, Mar. 27, 1979, abandoned, which is a continuation of Ser. No. 750,149, Dec. 13, 1976, abandoned.

[51] Int. Cl.$^3$ .......... B29F 3/10

[52] U.S. Cl. .......... 264/22; 264/27; 264/104; 264/105; 264/174; 264/DIG. 65; 264/272.11

[58] Field of Search .......... 264/22, 174, 272, DIG. 65, 264/27, 104, 105

[56] References Cited

U.S. PATENT DOCUMENTS

| | | | |
|---|---|---|---|
| 3,311,862 | 3/1967 | Rees | 338/211 |
| 3,352,958 | 11/1967 | Andrews | 264/272 |
| 3,823,217 | 7/1974 | Kampe | 264/105 |
| 3,829,545 | 8/1974 | Vlaenderen | 264/174 |
| 3,861,029 | 1/1975 | Smith-Johannsen | 29/611 |
| 3,914,363 | 10/1975 | Bedard | 264/105 |
| 3,925,597 | 12/1975 | Misiura | 264/174 |
| 3,928,519 | 12/1975 | Kashiyama | 264/174 |
| 3,941,866 | 3/1976 | Ingraham | 264/174 |
| 4,151,238 | 4/1979 | Ziemek et al. | 264/DIG. 65 |
| 4,177,446 | 12/1979 | Diaz | 338/212 |
| 4,204,086 | 5/1980 | Suzuki | 264/174 |

FOREIGN PATENT DOCUMENTS

| | | | |
|---|---|---|---|
| 399780 | 2/1978 | Sweden . | |
| 1077207 | 7/1967 | United Kingdom | 264/174 |
| 1112274 | 5/1968 | United Kingdom | 264/174 |
| 1167551 | 10/1968 | United Kingdom | 264/174 |
| 1369210 | 10/1974 | United Kingdom | 264/174 |
| 1449539 | 9/1976 | United Kingdom | 264/174 |
| 1516874 | 7/1978 | United Kingdom . | |

OTHER PUBLICATIONS

Wire & Cable Coater's Handbook, (E. I. Du Pont de Nemours & Co., Plastics Dept., 1968), pp. 4–7, 49 and 120–125.

Plastics Extrusion Technology, by Allan L. Griff, pp. 197, 198 and 208.

*Primary Examiner*—James H. Derrington

*Attorney, Agent, or Firm*—Lyon & Lyon

[57] ABSTRACT

In order to increase the stability of a device comprising at least one electrode and a conductive polymer composition in contact therewith, the contact resistance between the electrode and the composition should be reduced. This can be achieved by contacting the molten polymer composition with the electrode while the electrode is at a temperature above the melting point of the composition. Preferably, the polymer composition is melt-extruded over the electrode or electrodes, as for example when extruding the composition over a pair of pre-heated stranded wires.

28 Claims, No Drawings

METHOD OF MAKING ELECTRICAL DEVICES COMPRISING CONDUCTIVE POLYMER COMPOSITIONS

This is a continuation of application Ser. No. 24,369, filed Mar. 27, 1979, now abandoned, which is itself a continuation of application Ser. No. 750,149 filed Dec. 13, 1976, now abandoned.

BACKGROUND OF THE INVENTION

1. Field of the Invention

This invention relates to electrical devices in which an electrode is in contact with a conductive polymer composition.

2. Statement of the Prior Art

Conductive polymer compositions are well known. They comprise organic polymers having dispersed therein a finely divided conductive filler, for example carbon black or a particulate metal. Some such compositions exhibit so-called PTC (Positive Temperature Coefficient) behavior, i.e. they exhibit a rapid increase in electrical resistance over a particular temperature range. These conductive polymer compositions are useful in electrical devices in which the composition is in contact with an electrode, usually of metal. Devices of this kind are usually manufactured by methods comprising extruding or moulding the molten polymer composition around or against the electrode or electrodes. In the known methods, the electrode is not heated prior to contact with the polymer composition or is heated only to a limited extent, for example to a temperature well below the melting point of the composition, for example not more than 150° F. (65° C.) as in conventional wire-coating techniques. Well known examples of such devices are flexible strip heaters which comprise a generally ribbon-shaped core (i.e. a core whose cross-section is generally rectangular or dumbell-shaped) of the conductive polymer composition, a pair of longitudinally extending electrodes, generally of stranded wire, embedded in the core near the edges thereof, and an outer layer of a protective and insulating composition. Particularly useful heaters are those in which the composition exhibits PTC behavior, and which are therefore self-regulating. In the preparation of such heaters in which the composition contains less than 15% of carbon black, the prior art has taught that it is necessary, in order to obtain a sufficiently low resistivity, to anneal the heater for a time such that $$2L+5\log_{10}R \leqq 45$$

where L is the percent by weight of carbon and R is the resistivity in ohm.cm. For further details of known PTC compositions and devices comprising them, reference may be made to U.S. Pat. Nos. 2,978,665, 3,243,753, 3,412,358, 3,591,526, 3,793,716, 3,823,217, and 3,914,363, the disclosures of which are hereby incorporated by reference. For details of recent developments in this field, reference may be made to commonly assigned U.S. patent application Ser. Nos. 601,638 (now U.S. Pat. No. 4,177,376), 601,427 (now U.S. Pat. No. 4,017,715), 601,549 (now abandoned), and 601,344 (now U.S. Pat. No. 4,085,286) (all filed Aug. 4, 1975), 638,440 (now abandoned in favor of continuation-in-part application Ser. No. 775,882 issued as U.S. Pat. No. 4,177,446) and 638,687 (now abandoned in favor of continuation-in-part application Ser. No. 786,835 issued as U.S. Pat. No. 4,135,587) (both filed Dec. 8, 1975), the disclosures of which are hereby incorporated by reference.

A disadvantage which arises with devices of this type, and in particular with strip heaters, is that the longer they are in service, the higher is their resistance and the lower is their power output, particularly when they are subject to thermal cycling.

It is known that variations, from device to device, of the contact resistance betwen electrodes and carbon-black-filled rubbers is an obstacle to comparison of the electrical characteristics of such devices and to the accurage measurement of the resistivity of such rubbers, particularly at high resistivities and low voltages; and it has been suggested that the same is true of other conductive polymer compositions. Various methods have been suggested for reducing the contact resistance between carbon-black-filled rubbers and test electrodes placed in contact therewith. The preferred method is to vulcanise the rubber while it is in contact with a brass electrode. Other methods include copper-plating, vacuum-coating with gold, and the use of colloidal solutions of graphite between the electrode and the test piece. For details, reference should be made to Chapter 2 of "Conductive Rubbers and Plastics" by R. H. Norman, published by Applied Science Publishers (1970), from which it will be clear that the factors which govern the size of such contact resistance are not well understood. So far as we know, however, it has never been suggested that the size of the initial contact resistance is in any way connected with the changes in resistance which takes place with time in devices which comprise an electrode in contact with a conductive polymer composition, e.g. strip heaters.

SUMMARY OF THE INVENTION

We have surprisingly discovered that the less is the initial contact resistance between the electrode and the conductive polymer composition, the smaller is the increase in total resistance with time. We have also found that by placing or maintaining the electrode and the polymer composition in contact with each other while both are at a temperature above the melting point of the composition, preferably at least 30° F. (20° C.), especially at least 100° F. (55° C.), above the melting point, the contact resistance between them is reduced. It is often preferable that the said temperature should be above the Ring-and-Ball softening temperature of the polymer. The term "melting point of the composition" is used herein to denote the temperature at which the composition begins to melt.

The preferred process of the invention comprises:

(1) heating a conductive polymer composition to a temperature above its melting point;

(2) heating an electrode, in the absence of the conductive polymer composition, to a temperature above the melting point of the conductive polymer composition;

(3) contacting the electrode, while it is at a temperature above the melting point of the polymer composition, with the molten polymer composition; and (4) cooling the electrode and conductive polymer composition in contact therewith.

We have also found that for stranded wire electrodes, the contact resistance can be correlated with the force needed to pull the electrode out of the polymer composition. Accordingly the invention further provides a device comprising a stranded wire electrode embedded in a conductive polymer composition, the pull strength (P) of the electrode from the device being equal to at least 1.4 times $P_o$, where $P_o$ is the pull strength of an identical stranded wire electrode from a device which comprises the electrode embedded in an identical conductive polymer composition and which has been prepared by a process which comprises contacting the electrode, while it is at a temperature not greater than 75° F. (24° C.), with a molten conductive polymer composition. The pull strengths P and Po are determined as described in detail below.

We have also found that for strip heaters, currently the most widely used devices in which current is passed through conductive polymer compositions, the contact resistance can be correlated with the linearity ratio, a quantity which can readily be measured as described below. Accordingly the invention further provides a strip heater comprising:

(1) an elongate core of a conductive polymer composition;
(2) at least two longitudinally extending electrodes embedded in said composition parallel to each other; and
(3) an outer layer of a protective and insulating composition;

the linearity ratio between any pair of electrodes being at most 1.2, preferably at most 1.15, especially at most 1.10.

DESCRIPTION OF THE PREFERRED EMBODIMENTS OF THE INVENTION

The invention is useful with any type of electrode, for example plates, strips or wires, but particularly so with electrodes having an irregular surface, e.g. stranded wire electrodes as conventionally used in strip heaters, braided wire electrodes (for example as described in U.S. Application Ser. No. 601,549, now abandoned) and expandable electrodes as described in U.S. application Ser. No. 638,440, now abandoned. Preferred stranded wires are silver-coated and nickel-coated copper wires, which can be pre-heated to the required temperatures without difficulties such as melting or oxidation, as may arise with tin-coated or uncoated copper wires.

The conductive polymer compositions used in this invention generally contain carbon black as the conductive filler. In many cases, it is preferred that the compositions should exhibit PTC characteristics. Such PTC compositions generally comprises carbon black dispersed in a crystalline polymer (i.e. a polymer having at least about 20% crystallinity as determined by X-ray diffraction). Suitable polymers include polyolefins such as low, medium and high density polyethylenes, polypropylene and poly(1-butene), polyvinylidene fluoride and copolymers of vinylidene fluoride and tetrafluoroethylene. Blends of polymers may be employed, and preferred crystalline polymers comprise a blend of polyethylene and an ethylene copolymer which is selected from ethylene/vinyl acetate copolymers and ethylene/ethyl acrylate copolymers, the polyethylene being the principal component by weight of the blend. The amount of carbon black may be less than 15% by weight, based on the weight of the composition, but is preferably at least 15%, particularly at least 17%, by weight. The resistivity of the composition is generally less than 50,000 ohm.cm at 70° F. (21° C.), for example 100 to 50,000 ohm.cm. For strip heaters designed to be powered by A.C. of 115 volts or more, the composition generally has a resistivity of 2,000 to 50,000 ohm.cm, e.g. 2,000 to 40,000 ohm.cm. The compositions are preferably thermoplastic at the time they are contacted with the electrodes. However, they may be lightly cross-linked, or be in the process of being cross-linked, provided that they are sufficiently fluid under the contacting conditions to conform closely to the electrode surface.

As previously noted, the strip heaters of the invention preferably have a linearity ratio of at most 1.2, preferably at most 1.15, especially at most 1.10. The Linearity Ratio of a strip heater is defined as Resistance at 30 MV./Resistance at 100 V.

the resistances being measured at 70° F. (21° C.) between two electrodes which are contacted by probes pushed through the outer jacket and the conductive polymeric core of the strip heater. The contact resistance is negligible at 100 V., so that the closer the Linearity Ratio is to 1, the lower the contact resistance. The Linearity Ratio is to some extent dependent upon the separation and cross-sections of the electrodes and the resistivity of the conductive polymeric composition, and to a limited extent upon the shape of the polymeric core. However, within the normal limits for these quantities in strip heaters, the dependence on them is not important for the purposes of the present invention. The linearity ratio is preferably substantially constant throughout the length of the heater. When it is not, the average linearity ratio must be less than 1.2 and preferably it is below 1.2 at all points along the length of the heater.

The strip heaters generally have two electrodes separated by a distance of 60 to 400 mils (0.15 to 1 cm), but greater separations, e.g. up to 1 inch (2.5 cm.) or even more, can be used. The core of conductive polymer can be of the conventional ribbon shape, but preferably it has a cross-section which is not more than 3 times, especially not more than 1.5 times, e.g. not more than 1.1 times, its smallest dimension, especially a round cross-section.

As previously noted, we have found that for devices comprising stranded wire electrodes, the contact resistance can be correlated with the force needed to pull the electrode out of the polymer composition, an increase in pull strength reflecting a decrease in contact resistance. The pull strengths P and $P_o$ referred to above are determined at 70° F. (21° C.), as follows.

A 2 inch (5.1 cm) long sample of the heater strip (or other device), containing a straight 2 inch (5.1 cm) length of the wire, is cut off. At one end of the sample, one inch of the wire is stripped bare of polymer. The bared wire is passed downwardly through a hole slightly larger than the wire in a rigid metal plate fixed in the horizontal plane. The end of the bared electrode is firmly clamped in a movable clamp below the plate, and the other end of the sample is lightly clamped above the plate, so that the wire is vertical. The movable clamp is then moved vertically downwards at a speed of 2 inch/min. (5.1 cm/min.), and the peak force needed to pull the conductor out of the sample is measured.

When carrying out the preferred process of the invention, wherein the electrode and the polymer composition are heated separately before being contacted, it is preferred that the composition should be melt-extruded over the electrode, e.g. by extrusion around a wire electrode using a cross-head die. The electrode is generally heated to a temperature at least 30° F. (20° C.) above the melting point of the composition. The polymer composition will normally be at a temperature substantially above its melting point; the temperature of the electrode is preferably not more than 200° F. (110° C.) below, e.g. not more than 100° F. (55° C.) or 55° F. (30° C.) below, the temperature of the molten composition, and is preferably below, e.g. at least 20° F. (10° C.) below that temperature. The conductor should not, of course, be heated to a temperature at which it undergoes substantial oxidation or other degradation.

When the electrode and the composition are contacted at a temperature below the melting point of the composition and are then heated, while in contact with each other, to a temperature above the melting point of the composition, care is needed to ensure a useful reduction in the contact resistance. The optimum conditions will depend upon the electrode and the composition, but increased temperature and pressure help to achieve the desired result. Generally the electrode and composition should be heated together under pressure to a temperature at least 30° F. (20° C.), especially at least 100° F. (55° C.) above the melting point. The pressure may be applied in a press or by means of nip rollers. The time for which the electrode and the composition need be in contact with each other, at the temperature above the melting point of the composition, in order to achieve the desired result, is quite short. Times in excess of five minutes do not result in any substantial further reduction of contact resistance, and often times less than 1 minute are quite adequate and are therefore preferred. Thus the treatment time is of a quite different order from that required by the known annealing treatments to decrease the resistivity of the composition, as described for example in U.S. Pat. Nos. 3,823,217 and 3,914,363; and the treatment yields useful results even when the need for or desirability of an annealing treatment does not arise, as when the composition already has, without having been subjected to any annealing treatment or to an annealing treatment which leaves the resistivity at a level where $$2L+5\log_{10}R>45,$$

a sufficiently low resistivity, for example, by reason of a carbon black content greater than 15% by weight, e.g. greater than 17% or 20% by weight.

One way of heating the electrode and the composition surrounding it is to pass a high current through the electrode and thus produce the desired heat by resistance heating of the electrode.

Particularly when the conductive polymer composition exhibits PTC characteristics, it is often desirable that in the final product the composition should be cross-linked. Cross-linking can be carried out as a separate step after the treatment to reduce contact resistance; in this case, cross-linking with aid of radiation is preferred. Alternatively cross-linking can be carried out simultaneously with the said treatment, in which case chemical cross-linking with the aid of cross-linking initiators such as peroxides is preferred.

The invention is illustrated by the following Examples, some of which are comparative Examples.

In each of the Examples a strip heater was prepared as described below. The conductive polymer composition was obtained by blending a medium density polyethylene containing an antioxidant with a carbon black master batch comprising an ethylene/ethyl acrylate copolymer to give a composition containing the indicated percent by weight of carbon black. The composition was melt-extruded through a cross-head die having a circular orifice 0.14 inch (0.36 cm) in diameter over a pair of 22 AWG 19/34 silver-coated copper wires whose centers were on a diameter of the orifice and 0.08 inch (0.2 cm) apart. Before reaching the cross-head die, the wires were pre-heated by passing them through an oven 2 feet (60 cm) long at 800° C. The temperature of the wires entering the die was 180° F. (82° C.) in the comparative Examples, in which the speed of the wires through the oven and the die was 70 ft./min. (21 m/min), and 330° F. (165° C.) in the Examples of the invention, in which the speed was 50 ft./min. (15 m/min.)

The extrudate was then given an insulating jacket by melt-extruding around it a layer 0.02 inch (0.051 cm) thick of chlorinated polyethylene or an ethylene/tetrafluoroethylene copolymer. The coated extrudate was then irradiated in order to cross-link the conductive polymer composition.

EXAMPLES 1-3

These Examples, in which Example 1 is a comparative Example, demonstrate the influence of Linearity Ratio (LR) on Power Output when the heater is subjected to temperature changes. In each Example, the Linearity Ratio of the heater was measured and the heater was then connected to a 120 volt AC supply and the ambient temperature was changed continuously over a 3 minute cycle, being raised from −35° F. (−37° C.) to 150° F. (65° C.) over a period of 90 seconds and then reduced to −35° F. (−37° C.) again over the next 90 seconds.

The peak power output of the heater during each cycle was measured initially and at intervals and expressed as a proportion ($P_N$) of the initial peak power output.

The polymer composition used in Example 1 contained about 26% carbon black. The polymer composition used in Examples 2 and 3 contained about 22% carbon black.

The results obtained are shown in Table 1 below.

TABLE 1

| | *Example 1 | | Example 2 | | Example 3 | |
|---|---|---|---|---|---|---|
| No. of Cycles | $P_N$ | LR | $P_N$ | LR | $P_N$ | LR |
| None | 1 | 1.3 | 1 | 1.1 | 1 | 1 |
| 500 | 0.5 | 1.6 | 1.3 | — | 1 | 1 |
| 1100 | 0.3 | 2.1 | 1.2 | — | 1 | 1 |
| 1700 | — | — | 1.1 | 1.1 | 1 | 1 |

*Comparative Example

EXAMPLES 4-7

These Examples, which are summarised in Table 2 below, demonstrate the effect of pre-heating the electrodes on the Linearity Ratio and Pull Strength of the product.

TABLE 2

| Example No. | % Carbon Black | Linearity Ratio |
|---|---|---|
| *4 | 22 | 1.6 |
| 5 | 22 | 1.0 |
| *6 | 23 | 1.35 |
| 7 | 23 | 1.1 |

*Comparative Example

The ratio of the pull strengths of the heater strips of Examples 7 and 6 ($P/P_o$) was 1.45.

I claim:

1. A process for the preparation of an electrical device which has improved resistance stability under service conditions, which comprises at least two electrodes, each of said electrodes being in physical and electrical contact with a conductive polymer composition, and in which, when said electrodes are connected to a source of electrical power, current passes between the electrodes through the conductive polymer composition, which process comprises contacting each of said electrodes with conductive polymer composition by (1) heating a thermoplastic electrically conductive polymer composition above its melting point;

(2) heating each electrode, in the absence of the conductive polymer composition, to a temperature above the melting point of the conductive polymer composition;

(3) (contacting) bringing each electrode which has been heated in step (2), while it is at a temperature above the melting point of the conductive polymer composition, into direct physical contact with the molten conductive polymer composition prepared in step (1); and (4) cooling each electrode and conductive polymer composition in contact therewith prepared in step (3), whereby the contact resistance between each of the electrodes and the conductive polymer in contact therewith is reduced.

2. A process according to claim 1 wherein there is prepared a self-regulating strip heater comprising (a) an elongate core of an electrically conductive polymer composition which comprises carbon black and exhibits PTC behavior;

(b) at least two longitudinally extending electrodes embedded in said elongate core parallel to each other; and (c) an outer layer of electrically insulating composition, which process comprises (1) heating a thermoplastic electrically conductive polymer composition above its melting point;

(2) heating said electrodes, in the absence of the conductive polymer composition, to a temperature above the melting point of the conductive polymer composition;

(3) melt-extruding the molten conductive polymer composition over the electrodes, while each of the electrodes is at a temperature above the melting point of the conductive polymer composition, thereby forming an elongate extrudate of the electrically conductive composition with the electrodes embedded therein parallel to each other;

(4) cooling the electrode and conductive polymer composition in contact therewith; and (5) forming an outer layer of an electrically insulating composition around the cooled extrudate of the conductive polymer composition.

3. A process according to claim 2 wherein the electrodes are stranded wire electrodes.

4. A process according to claim 3 wherein the electrodes are selected from silver-coated copper wires and nickel-coated copper wires.

5. A process according to claim 2 wherein each of the electrodes, when first contacted by the molten conductive polymer composition, is at a temperature at least 30° F. above the melting point of the conductive polymer composition.

6. A process according to claim 5 wherein each of the electrodes, when first contacted by the molten conductive polymer composition, is at a temperature which is not more than 100° F. below the temperature of the molten conductive polymer composition.

7. A process according to claim 6 wherein each of the electrodes, when first contacted by the molten conductive polymer composition, is at a temperature which is not more than 55° F. below the temperature of the molten conductive polymer composition.

8. A process according to claim 5 wherein each of the electrodes, when contacted by the molten conductive polymer composition, is at a temperature at least 100° F. above the melting point of the conductive polymer composition.

9. A process according to claim 2 which further comprises the step of (6) irradiating the coated extrudate obtained in step (5) to cross-link the conductive polymer composition.

10. A process according to claim 2 wherein the conductive polymer composition in the strip heater has a resistivity at 70° F. of 100 to 50,000 ohm.cm.

11. A process according to claim 10 wherein the conductive polymer composition in the strip heater has a resistivity of 2,000 to 40,000 ohm.cm.

12. A process according to claim 1 which further comprises the step of cross-linking the conductive polymer composition.

13. A process according to claim 12 wherein the conductive polymer composition is cross-linked with the aid of radiation.

14. A process according to claim 12 wherein the conductive polymer composition is chemically cross-linked.

15. A process according to claim 3 wherein the electrodes are 60 to 400 mils apart.

16. A process for the preparation of a self-regulating strip heater having improved resistance stability under service conditions, which process comprises (1) heating a thermoplastic electrically conductive polymer composition above its melting point, said conductive polymer composition (a) comprising a crystalline polymer having carbon black dispersed therein, (b) having a volume resistivity at 70° F. of 100 to 50,000 ohm.cm, and (c) exhibiting PTC behavior;

(2) heating at least two electrodes, in the absence of the conductive polymer composition, to a temperature above the melting point of the conductive polymer composition;

(3) melt-extruding the molten conductive polymer composition produced in step (1) over the electrodes heated in step (2), each of said electrodes being at a temperature above the melting point of the conductive polymer composition when first contacted by the molten conductive polymer composition, thereby forming an elongate extrudate of the electrically conductive composition with the electrodes embedded therein and in direct physical contact therewith, the electrodes being parallel to each other; and (4) cooling the extrudate formed in step (3), whereby the contact resistance between each of the electrodes and the conductive polymer in contact therewith is reduced.

17. A process according to claim 16 which further comprises the step of forming an outer layer of an electrically insulating composition around the cooled extrudate produced in step (4).

18. A process according to claim 16 which further comprises the step of cross-linking the conductive polymer composition after it has been melt-extruded around the electrodes.

19. A process according to claim 15 wherein the conductive polymer composition is extruded over a pair of stranded wire electrodes which are separated by a distance of up to 1 inch.

20. A process according to claim 19 wherein the electrodes are separated by a distance of 60 to 400 mils.

21. A process according to claim 19 wherein the electrodes are selected from silver-coated copper wires and nickel-coated copper wires.

22. A process according to claim 16 wherein each of the electrodes, when first contacted by the conductive polymer composition, is at a temperature which is at least 100° F. above the melting point of the conductive polymer composition and not more than 55° F. below the temperature of the molten conductive polymer composition.

23. A process according to claim 16 wherein the conductive polymer composition contains at least 15% by weight, based on the weight of the composition, of carbon black.

24. A process according to claim 23 wherein the conductive polymer composition contains at least 17% by weight, based on the weight of the composition, of carbon black.

25. A process according to claim 16 wherein the conductive polymer composition comprises carbon black dispersed in a crystalline polymer which comprises a blend of polyethylene and an ethylene copolymer selected from ethylene/vinyl acetate copolymers and ethylene/ethyl acrylate copolymers, the polyethylene being the principal component of the blend by weight.

26. A process according to claim 1 wherein the electrically conductive polymer composition comprises a polymer which has at least about 20% crystallinity as determined by X-ray diffraction and which is selected from the group consisting of polyolefins, polyvinylidene fluoride and copolymers of vinylidene fluoride and tetrafluoroethylene.

27. A process according to claim 1 wherein the electrically conductive polymer composition comprises carbon black dispersed in a crystalline polymer which comprises a blend of polyethylene and an ethylene copolymer selected from ethylene/vinyl acetate copolymers and ethylene/ethyl acrylate copolymers.

28. A process according to claim 16 wherein the electrically conductive polymer composition comprises a polymer which has at least about 20% crystallinity as determined by X-ray diffraction and which is selected from the group consisting of polyolefins, polyvinylidene fluoride and copolymers of vinylidene fluoride and tetrafluoroethylene.

* * * * *

US004426339B1

REEXAMINATION CERTIFICATE (2154th)

United States Patent [19]

[11] B1 4,426,339

[45] Certificate Issued Dec. 21, 1993

Kamath et al.

[54] METHOD OF MAKING ELECTRICAL DEVICES COMPRISING CONDUCTIVE POLYMER COMPOSITIONS

[75] Inventors: Hundi P. Kamath, Foster City; Jeffrey C. Leder, Redwood City, both of Calif.

[73] Assignee: Raychem Corp., Menlo Park, Calif.

Reexamination Requests:

No. 90/001,240, May 11, 1987
No. 90/001,178, Mar. 2, 1987

Reexamination Certificate for:

Patent No.: 4,426,339
Issued: Jan. 17, 1984
Appl. No.: 251,910
Filed: Apr. 7, 1981

Related U.S. Application Data

[63] Continuation of Ser. No. 24,369, Mar. 27, 1979, abandoned, which is a continuation of Ser. No. 750,149, Dec. 13, 1976, abandoned.

[51] Int. Cl.[5] .................... B29C 35/00; B29C 47/00

[52] U.S. Cl. .................... 264/22; 219/549; 219/553; 264/27; 264/104; 264/105; 264/174; 264/DIG. 65; 264/272.11; 338/22 R

[58] Field of Search .................... 264/22, 27, 104, 105, 264/74, 272.11, DIG. 65

[56] References Cited

U.S. PATENT DOCUMENTS

| | | | |
|---|---|---|---|
| 2,494,589 | 5/1947 | Sletner | 201/63 |
| 2,978,665 | 4/1961 | Vernet et al. | 338/223 |
| 3,243,753 | 3/1966 | Kohler . | |
| 3,311,862 | 3/1967 | Rees | 338/211 |
| 3,342,752 | 9/1967 | Wada | 252/511 |
| 3,344,385 | 9/1967 | Bartos et al. | 338/212 |
| 3,352,958 | 11/1967 | Andrews | 264/255 |
| 3,387,248 | 6/1968 | Rees | 338/211 |
| 3,410,984 | 11/1968 | Sandford et al. . | |
| 3,412,358 | 11/1968 | Hummel | 228/7 |
| 3,435,401 | 3/1969 | Epstein . | |
| 3,503,823 | 3/1970 | Richart et al. | 156/244 |
| 3,617,695 | 11/1971 | Meyer . | |
| 3,642,532 | 2/1972 | Greene | 117/233 |
| 3,673,121 | 6/1972 | Meyer . | |

(List continued on next page.)

FOREIGN PATENT DOCUMENTS

| | | |
|---|---|---|
| 1017395 | 9/1977 | Canada . |
| 1020998 | 11/1977 | Canada . |
| 846422 | 9/1939 | France . |
| 16935 | 7/1968 | Japan . |
| 2632 | 1/1971 | Japan . |
| 46136 | 11/1972 | Japan . |
| 32014 | 10/1973 | Japan . |
| 128844 | 10/1975 | Japan . |

(List continued on next page.)

OTHER PUBLICATIONS

Boonstra, B. B. S. T., and Dannenberg, E. M. "Electrical Conductivity of Rubber-Carbon Black Vulcanites", *I& EC* 46(1) pp. 28-217 (Jan. 1954).

Griesser, E. E. and Suba, M. M. "The Effects of Conductor Temperature on the Quality of Extruded Vinyl Wire Insulation," *Rubber Age* pp. 39-398 (Jun., 1955).

Dominghaus, H. and Hagen, H., *Polyathylen und Andere Polyolefine,* Verlag Brunke Garrels, Hamburg, pp. 252-255 (1958).

E. G. Fisher, *Extrusion of Plastics,* Iliffe Books Ltd. (1958) Chap. 9 "The Complete Extrusion Process", pp. 200-234.

(List continued on next page.)

*Primary Examiner*—James Derrington

[57] ABSTRACT

In order to increase the stability of a device comprising at least one electrode and a conductive polymer composition in contact therewith, the contact resistance between the electrode and the composition should be reduced. This can be achieved by contacting the molten polymer composition with the electrode while the electrode is at a temperature above the melting point of the composition. Preferably, the polymer composition is melt-extruded over the electrode or electrodes, as for example when extruding the composition over a pair of pre-heated stranded wires.

U.S. PATENT DOCUMENTS

| | | | |
|---|---|---|---|
| 3,676,925 | 7/1972 | Sato et al. | 29/613 |
| 3,760,695 | 9/1973 | Meyer . | |
| 3,793,716 | 2/1974 | Smith-Johannsen | 29/611 |
| 3,823,217 | 8/1974 | Kampe | 219/553 |
| 3,829,545 | 8/1974 | Van Vlaenderen | 264/174 |
| 3,858,144 | 12/1974 | Bedard et al. . | |
| 3,861,029 | 1/1975 | Smith-Johannsen et al. | 29/611 |
| 3,862,056 | 1/1975 | Hartmann . | |
| 3,914,363 | 10/1975 | Bedard et al. | 264/105 |
| 3,925,597 | 12/1975 | Misiura et al. | 174/102 |
| 3,928,519 | 12/1975 | Kashiyama et al. | 264/40 |
| 3,941,866 | 3/1976 | Ingraham | 264/135 |
| 3,971,610 | 7/1976 | Buchoff et al. | 339/17 |
| 4,055,526 | 10/1977 | Kiyokawa et al. | 264/22 |
| 4,066,840 | 1/1978 | Alligaier | 174/72 |
| 4,151,238 | 4/1979 | Ziemek et al. | 264/45.5 |
| 4,177,376 | 12/1979 | Horsma et al. | 219/553 |
| 4.177,446 | 12/1979 | Diaz | 338/212 |
| 4.188,276 | 2/1980 | Lyons et al. . | |

(List continued on next page.)

FOREIGN PATENT DOCUMENTS

| | | | |
|---|---|---|---|
| 128845 | 10/1975 | Japan . |
| 399780 | 2/1978 | Sweden . |
| 828334 | 2/1960 | United Kingdom . |
| 1077207 | 7/1967 | United Kingdom . |
| 1112274 | 5/1968 | United Kingdom . |
| 1167551 | 10/1969 | United Kingdom . |

(List continued on next page.)

OTHER PUBLICATIONS

Griff, Allan L., *Plastics Extrusion Technology* 2nd Ed., Reinhold Book Corp., N.Y. pp. 192-233 (1968); Chap. 7, "Wire & Cable Covering".

Norman, R. H., *Conductive Rubbers and Plastics*, Applied Science Publishers Ltd., London, pp. 7-29 (1970); Chap. 2 "Contact Resistance,".

Meyer, J., "Glass Transition Temperature as a Guide to Selection of Polymers Suitable for PTC Materials", *Polymer Eng. and Sci.* 14(6), pp. 462-468 (Nov. 1973).

Meyer, J. "Stability of Polymer Composites as Positive-Temperature-Coefficient Resistors", *Polymer Engineering and Science* 14(10) pp. 706-716 (Oct. 1974).

Lowe, C. & Joyce, W. H. "High Density Polyethylene Wire Extrusion" *Wire and Wire Products* 37(7) pp. 862-865 (Jul., 1960).

Tarbox, A. E., "Semiconductor Compounds for Wire and Cable Extrusion", *Wire and Wire Products* pp. 1385, 1387, 1640-1461 (Oct., 1961).

Stiles, E. P., "Extruding High Density Polyethylene for Quality and Saving" *Wire and Wire Products* pp. 222-224, 274 (Feb. 1963).

Iijima, A., "High Speed Electric Wire Covering Equipment", *Japan Plastic Age News* pp. 32 ∝ 34 (Jun., 1963).

Cox, W. J., *Paper, Proceedings of the International Wire and Cable Symposium* 13*th*, Atlantic City, N.J., Dec. 2-4, 1964.

Mink, W., *Grundzuge der Extrudertechnik*, Rudolf Zechner Verlag, Speyer/Rhein, Germany, p. 300 (1964).

Schenkel, G., *Plastics Extrusion Technology and Theory*, American Elsevier Pub. Co., Inc., N.Y., pp. 301-318 (1966).

McNally, W. M., "Here's How to Extrude Polyethylene Copolymers for Wire and Cable Coating", *Plastics Technology* pp. 41-43 (Jan., 1967).

J. A. Brydson, *Plastics* Materials, Robert E. Krieger Pub. Co., Inc, (1975), pp. 194, 97-200.

*Mildner* (IEE Trans. on Power Apparatus, 89, pp. 313-318 (Feb. 1970).

Lectures On Electronics, vol. 6, p. 202 (Apr. 1959).

Eager et al. IEEE Trans. Power Apparatus and Systems, vol. PAS-89 342-364, Apr. 1969.

Military Specification MIL-W-81822A, Supplement 1, Mar. 3, 1982.

Sawyer et al., Modern Plastics (Jun. 1967), pp. 125-128, 201-202.

McKelvey, Polymer Processing (1962) pp. 154-155, 161 and 162.

IEE Standard Dictionary of Electrical and Electronic Terms, pp. 114, 199, 200, 302, 469, 830, 831 amd 1025.

Rome Cable URD Technical Manual (1967) pp. 17-20, 37-41, and 83-87.

Handbook of Electrical and Electronic Insulating Materials, by Shugg (1986), p. 116.

Shaw, Introduction to Colloid and Surface Chemistry, pp. 1 and 167.

Encyclopedia of Industrial Chemical Analysis, p. 179.

Voet, J. Physical Chemistry 61 (1957) pp. 301-309.

Metals Handbook, 8th Edition, vol. 1, published by American Society for Metals, 1961, p. 41.

(List continued on next page.)

U.S. PATENT DOCUMENTS

| | | | |
|---|---|---|---|
| 4,200,973 | 5/1980 | Farkas . | |
| 4,204,086 | 5/1980 | Suzuki | 174/102 R |
| 4,271,350 | 6/1981 | Crowley . | |
| 4,272,471 | 6/1981 | Walker | 264/104 |
| 4,277,673 | 7/1981 | Kelly . | |
| 4,286,376 | 9/1981 | Smith-Johannsen et al. | 29/611 |
| 4,304,987 | 12/1981 | Van Konynenburg | 219/553 |
| 4,309,596 | 1/1982 | Crowley . | |
| 4,330,703 | 5/1982 | Horsma et al. | 219/553 |
| 4,334,148 | 6/1982 | Kampe | 219/553 |
| 4,421,582 | 12/1983 | Horsma | 156/86 |
| 4,444,708 | 4/1984 | Gale . | |
| 4,534,889 | 8/1985 | van Konynenburg et al. | 252/511 |

FOREIGN PATENT DOCUMENTS

| | | |
|---|---|---|
| 1202166 | 8/1970 | United Kingdom . |
| 1369210 | 10/1974 | United Kingdom . |
| 1449539 | 9/1976 | United Kingdom . |
| 1456047 | 11/1976 | United Kingdom . |
| 1456048 | 11/1976 | United Kingdom . |
| 1516874 | 7/1978 | United Kingdom . |

OTHER PUBLICATIONS

Cabot Technical Report S-8.
Chemelex "Autotrace" Instruction (Jun., 1973).
Chemelex "Autotrace" Instruction (Dec., 1973).
Wire and Cable Coater's Handbook (du Pont Plastics Dept., 1968) pp. 4-7 and pp. 120-125.
Skewis (Wire, Oct. 1961, pp. 1338-1344 and pp. 1468-1469).
McKelvey (Polymer Processing (1962), Chapters 6 and 14).
Amey et al. (Proc. ASTM 49, pp. 1079-1091).
Field (Proc. ASTM 54, pp. 456-478).
Murphy et al, (Bell Systems Technical Journal 16, pp. 493-512).
Thompson et al. (Trans AIEE 64, 295-299).
Dorcas et al. (Rev. Sci. Instr. 35, pp. 1175-1176).
Cole et al., (J. Chem. Phys. 10, pp. 98-105).
Witt et al. (Modern Plastics 24, pp. 151-152, 244, 246 and 248).
Greenfield (Electrical Engineering, 66, pp. 698-703).
LaFlamme (Rev. Sci. Instr., 35, pp. 1193-1196).
Pohl et al. (JACS, 84, pp. 2699-2704).
Pruden (Wire and Wire Products, May 1970, pp. 67-73).
Brennan et al. (Wire J., Sep. 1973, pp. 110-115).
Hicks et al. (Adhesives Age, May 1969, pp. 21-26).
Johnson (Wire, Mar. 1963, pp. 366-368 and pp. 416-417).
Dummer "Materials for Conductive and Resistive Functions" (1970) Sections 4.13, 7.3 to 7.6, 11.1, 12.8 to 12.10 and 15.2 to 15.3.
Hagen et al (Polyaethyle und Andere Polyolefine, 1961, p. 252) (partial translation provided).
Mildner et al (II) ("The Electrical Characteristics of Some Resistive Plastics for the Wire and Cable Industry").
Dainichi-Nippon Cables Review (Nov. 1966), pp. 78-79.
Brochure entitled "NUC Polyethylene for Wires and Cables" published by Nitto Unicar Co., Ltd.
Brochure entitled "Extrusion Coating of Wires with Polyethylene by Nitto Unicar Co., Ltd.", published by Nitto Unicar Co. Ltd.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 1, line 17–Column 2, line 2:

Conductive polymer compositions are well known. They comprise organic polymers having dispersed therein a finely divided conductive filler, for example carbon black or a particulate metal. Some such compositions exhibit so-called PTC (Positive Temperature Coefficient) behavior, i.e. they exhibit a rapid increase in electrical resistance over a particular temperature range. These conductive polymer compositions are useful in electrical devices in which the composition is in contact with an electrode, usually of metal. Devices of this kind are usually manufactured by methods comprising extruding or moulding the molten polymer composition around or against the electrode or electrodes. In the known methods, the electrode is not heated prior to contact with the polymer composition or is heated only to a limited extent, for example to a temperature well below the melting point of the composition, for example not more than 150° F. (65° C.) [as in conventional wire-coating techniques]. Well known examples of such devices are flexible strip heaters which comprise a generally ribbon-shaped core (i.e. a core whose cross-section is generally rectangular or dumbell-shaped) of the conductive polymer composition, a pair of longitudinally extending electrodes, generally of stranded wire, embedded in the core near the edges thereof, and an outer layer of a protective and insulating composition. Particularly useful heaters are those in which the composition exhibits PTC behavior, and which are therefore self-regulating. In the preparation of such heaters in which the composition contains less than 15% of carbon black, the prior art has taught that it is necessary, in order to obtain a sufficiently low resistivity, to anneal the heater for a time such that $$2L+5\log_{10}R\leq 45$$

where L is the percent by weight of carbon and R is the resistivity in ohm.cm. For further details of known PTC compositions and devices comprising them, reference may be made to U.S. Pat. Nos. 2,978,665, 3,243,753, 3,412,358, 3,591,526, 3,793,716, 3,823,217, and 3,914,363, the disclosures of which are hereby incorporated by reference. For details of recent developments in this field, reference may be made to commonly assigned U.S. patent application Ser. Nos. 601,638 (now U.S. Pat. No. 4,177,376), 601,427 (now U.S. Pat. No. 4,017,715), 601,549 (now abandoned), and 601,344 (now U.S. Pat. No. 4,085,286) (all filed Aug. 4, 1975), 638,440 (now abandoned in favor of continuation-in-part application Ser. No. 775,882 issued as U.S. Pat. No. 4,177,446) and 638,687 (now abandoned in favor of continuation-in-part application Ser. No. 786,835 issued as U.S. Pat. No. 4,135,587) (both filed Dec. 8, 1975), the disclosures of which are hereby incorporated by reference.

Column 2, lines 8–34:

It is known that variations, from device to device, of the contact resistance between electrodes and carbon-black-filled rubbers is an obstacle to comparison of the electrical characteristics of such devices and to the [accurage] *accurate* measurement of the resistivity of such rubbers, particularly at high resistivities and low voltages; and it has been suggested that the same is true of other conductive polymer compositions. Various methods have been suggested for reducing the contact resistance between carbon-black-filled rubbers and test electrodes placed in contact therewith. The preferred method is to vulcanise the rubber while it is in contact with a brass electrode. Other methods include copper-plating, vacuum-coating with gold, and the use of colloidal solutions of graphite between the electrode and the test piece. For details, reference should be made to Chapter 2 of "Conductive Rubbers and Plastics" by R. H. Norman, published by Applied Science Publishers (1970), from which it will be clear that the factors which govern the size of such contact resistance are not well understood. So far as we know, however, it has never been suggested that the size of the initial contact resistance is in any way connected with the changes in resistance which takes place with time in devices which comprise an electrode in contact with a conductive polymer composition, e.g. strip heaters.

Column 2, lines 37–51:

We have surprisingly discovered that the less is the initial contact resistance between the electrode and the conductive polymer composition, the smaller is the increase in total resistance with time. We have also found that by placing or maintaining the electrode and the polymer composition in contact with each other while both are at a temperature above the melting point of the composition, preferably at least 30° F. (20° C.), especially at least 100° F. (55° C.), above the melting point, the contact resistance between them is reduced*; said temperature can be for example at least 330° F. (165° C.)*. It is often preferable that the said temperature should be above the Ring-and-Ball softening temperature of the polymer. The term "melting point of the composition" is used herein to denote the temperature at which the composition begins to melt.

Column 3, line 45–Column 4, line 8:

The conductive polymer compositions used in this invention generally contain carbon black as the conductive filler. In many cases, it is preferred that the compositions should exhibit PTC characteristics. Such PTC compositions generally comprises carbon black dispersed in a crystalline polymer (i.e. a polymer having at least about 20% crystallinity as determined by X-ray diffraction). Suitable polymers include polyolefins such as low, medium and high density polyethylenes, polypropylene and poly(1-butene), polyvinylidene fluoride and copolymers of vinylidene fluoride and tetrafluoroethylene. Blends of polymers may be employed, and preferred crystalline polymers comprise a blend of polyethylene and an ethylene copolymer which is selected from ethylene/vinyl acetate copolymers and ethylene/ethyl acrylate copolymers, the polyethylene being the principal component by weight of the blend. The amount of carbon black may be less than 15% by weight, based on the weight of the composition, but is preferably at least 15%, particularly at least 17%, by weight *and may be, for example, up to 22% by weight of the composition*. The resistivity of the composition is generally less than 50,000 ohm.cm at 70° F. (21° C.), for example 100 to 50,000 ohm.cm. For strip heaters designed to be powered by A.C. of 115 volts or more, the composition generally has a resistivity of 2,000 to 50,000 ohm.cm, e.g. 2,000 to 40,000 ohm.cm. The compositions are preferably thermoplastic at the time they are contacted with the electrodes. However, they may be lightly cross-linked, or be in the process of being cross-linked, provided that they are sufficiently fluid under the contacting conditions to conform closely to the electrode surface.

Column 4, lines 9-33:

As previously noted, the strip heaters of the invention preferably have a linearity ratio of at most 1.2, preferably at most 1.15, especially at most 1.10. The Linearity Ratio of a strip heater is defined as Resistance at 30 [MV] *mV*./Resistance at 100 V.

the resistances being measured at 70° F. (21° C.) between two electrodes which are contacted by probes pushed through the outer jacket and the conductive polymeric core of the strip heater. The contact resistance is negligible at 100V, so that the closer the Linearity Ratio is to 1, the lower the contact resistance. The Linearity Ratio is to some extent dependent upon the separation and cross-sections of the electrodes and the resistivity of the conductive polymeric composition, and to a limited extent upon the shape of the polymeric core. However, within the normal limits for these quantities in strip heaters, the dependence on them is not important for the purposes of the present invention. The linearity ratio is preferably substantially constant throughout the length of the heater. When it is not, the average linearity ratio must be less than 1.2 and preferably it is below 1.2 at all points along the length of the heater.

Column 7, line 3:

[I] *We* claim:

AS A RESULT OF REEXAMINATION, IT HAS BEEN DETERMINED THAT:

Claims 1-27 and 28 are cancelled.

* * * * *